Figure 1:
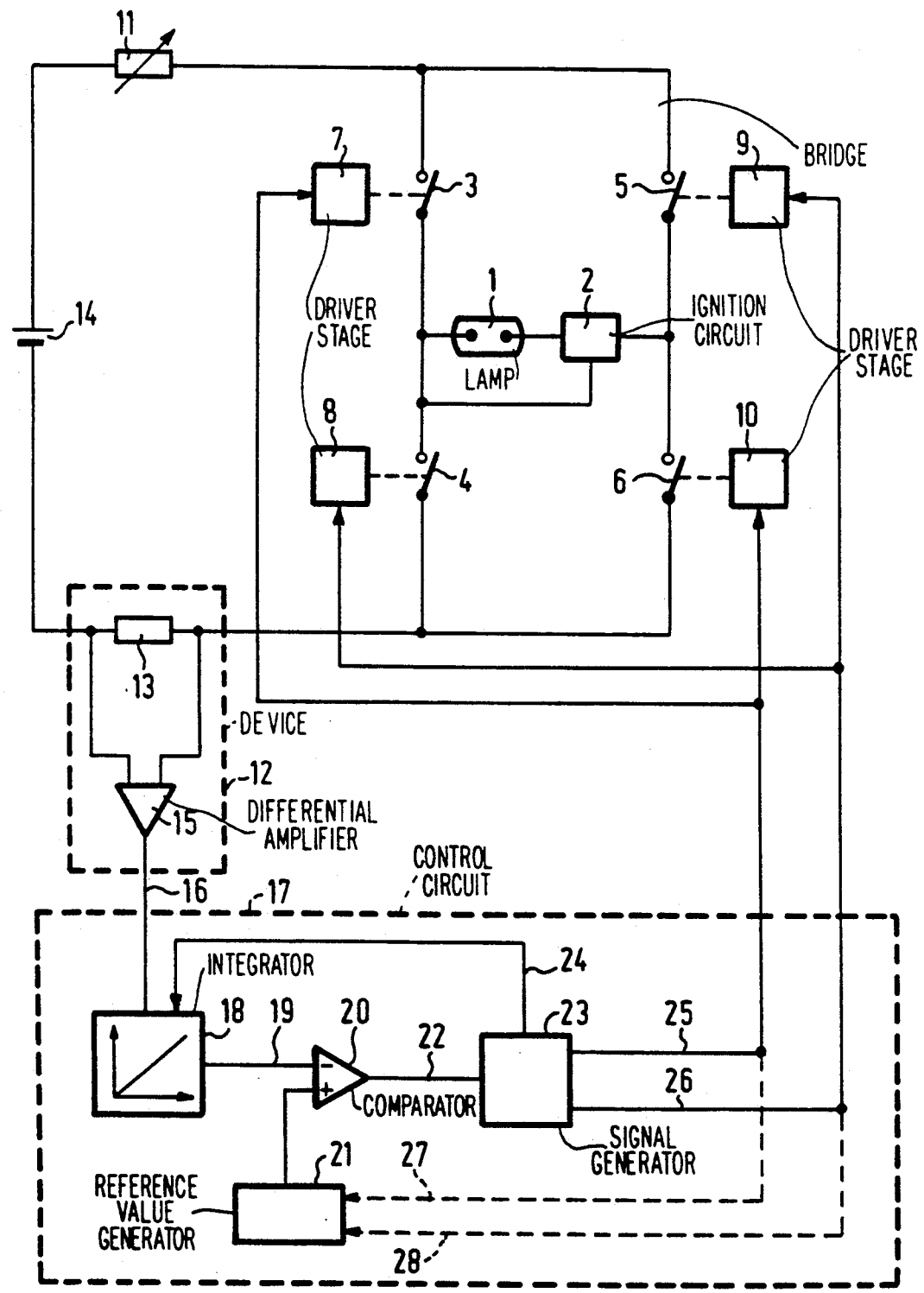

United States Patent [19]

Schäfer et al.

[11] Patent Number: 5,113,085
[45] Date of Patent: May 12, 1992

[54] CIRCUIT ARRANGEMENT FOR SUPPLYING A LOAD

[75] Inventors: Ralf Schäfer; Armin Wegener, both of Aachen, Fed. Rep. of Germany

[73] Assignee: U.S. Philips Corporation, New York, N.Y.

[21] Appl. No.: 573,523

[22] Filed: Aug. 23, 1990

[30] Foreign Application Priority Data

Aug. 31, 1989 [DE] Fed. Rep. of Germany ....... 3928809

[51] Int. Cl.$^5$ ..................... H03K 17/51; H03K 17/56; H02M 7/53
[52] U.S. Cl. ................................... 307/239; 307/254; 307/571; 363/49; 363/98; 315/307
[58] Field of Search ....................... 307/239, 254, 571; 315/307; 363/49, 98

[56] References Cited

U.S. PATENT DOCUMENTS

| | | | |
|---|---|---|---|
| 3,585,406 | 6/1971 | Colter | 307/254 |
| 4,118,641 | 10/1978 | Lannuzel | 307/254 |
| 4,694,383 | 9/1987 | Nguyen et al. | 363/98 |
| 4,710,686 | 12/1987 | Guzik | 363/98 |
| 4,866,592 | 9/1989 | Fujii et al. | 363/98 |
| 4,879,641 | 11/1989 | Rossi et al. | 363/98 |
| 4,939,633 | 7/1990 | Rhodes et al. | 363/98 |

Primary Examiner—John Zazworsky

[57] ABSTRACT

A circuit arrangement is described for supplying a load (1) from a direct voltage source (14) through a switch bridge (3 to 6), by which the direct voltage source (14) can be connected in alternating polarity to the load (1), comprising a control circuit (17) for controlling the switch bridge (3 to 6); and including a circuit for precisely adjusting and controlling a given D.C. component through the load by a device for measuring a current (I1) through the load (1) and supplying a corresponding measurement value and in that the control circuit (17) comprises an integration stage (18) for integrating the measurement value, a comparison stage (20) for comparing the integrated measurement value with a reference value (of 21) and for supplying a switching signal (at 22) when these values correspond to each other and a signal-producing stage (23) for resetting the integration stage (18) to an initial state and for reversing the polarity of the current (I1) through the load (1) upon the occurrence of the switching signal (at 22).

5 Claims, 4 Drawing Sheets

CIRCUIT ARRANGEMENT FOR SUPPLYING A LOAD

The invention relates to a circuit arrangement for supplying a load from a direct voltage source through a switch bridge, by means of which the direct voltage source can be connected to the load in alternating polarity, comprising a control circuit for controlling the switch bridge.

U.S. Pat. No. 3,700,960 discloses a circuit arrangement for operating a rod-shaped metal halide lamp. This circuit arrangement should eliminate the non-uniformity of the light emission of such a lamp over its length, which is caused especially by cataphoresis and non-uniform operating temperatures, in that a D.C. component whose value and polarity are controlled, is superimposed on the discharge current of the lamp. For this purpose, an arrangement is proposed, in which the lamp is supplied from a direct voltage source under the control of a control circuit, in which semiconductor elements are used as polarity reversal switches. The time for which the current flows in one polarity is determined by the direction and the degree of non-uniformity of the lamp radiation. For this purpose, a pair of photosensors measuring the light quantity are arranged at opposite ends of the lamp. The signals emitted by them are supplied to a differential amplifier, which is in the form of a zero passage detector. By means of the output signal of this differential amplifier, driver circuits are controlled, by which the transistor power switches are switched.

The known circuit arrangement especially requires due to the photosensors a more complicated construction. Moreover, due to the fact that foreign light of different intensity is incident upon the photosensors, there is a risk of the occurrence of a non-compensated control error and hence of an undesired direct current.

The invention has for its object to provide a simple circuit arrangement for precisely adjusting and controlling a given direct current component through a load.

According to the invention, this object is achieved in a circuit arrangement of the kind mentioned in the opening paragraph by a device for measuring a current through the load and for supplying a corresponding measurement value and in that the control circuit comprises an integration stage for integrating the measurement value, a comparison stage for comparing the integrated measurement value with a reference value and for supplying a switching signal when these values correspond to each other and a signal-producing stage for resetting the integration stage to an initial state and for reversing the polarity of the current through the load upon the occurrence of the switching signal.

In the circuit arrangement according to the invention, a direct measurement of the current through the load therefore takes place, measuring errors from a light measurement, as in the arrangement according to U.S. Pat. No. 3,700,960 being excluded from the beginning. The control in the circuit arrangement according to the invention is moreover effected by a charge integration with the same integration stage for both polarities of the current. As a result, further error sources are excluded. With a reference value constant during the whole operation of the circuit arrangement according to the invention, the electric charge flowing through the load is therefore adjusted on an average exactly to zero so that from the beginning a cataphoresis cannot occur, even upon the occurrence of inevitable manufacturing tolerances of the construction of the circuit. A balancing of the circuit arrangement necessary in the subject matter of U.S. Pat. No. 3,700,960 then also becomes superfluous.

Moreover, the circuit arrangement according to the invention can be used for an arbitrary load and not only for supplying a metal halide lamp, as that according to U.S. Pat. No. 3,700,960.

By the adjustment of the reference value, the period duration in which the direct voltage source can be connected to the load in alternating polarity can further be determined. By the choice of different reference values for the different polarities of the current through the load, the flow of charge can moreover be controlled in a simple and precise manner so that on an average a (pulsatory) direct current flows. Preferably, the reference value can be switched each time upon the occurrence of the switching signal to each time the other of two given values. The adjustment described then takes place by indication of these reference values.

More particularly in the case of a load having an arbitrarily non-linear current-voltage characteristic curve, an exactly proportioned D.C. component can intentionally be impressed in this manner independently of the direct voltage source available. In the special case, this D.C. component disappears.

It should be noted here that European Patent Application 361 389 discloses a circuit arrangement for converting direct current energy into alternating current energy, which comprises a circuit for eliminating a D.C. component. The output signal is then measured by a D.C./A.C. converter circuit and this measurement signal is compared in a calculation circuit with a reference signal, a first output control signal being obtained. This first output control signal is processed in the circuit arrangement for eliminating the D.C. component and a second output control signal is then obtained. The D.C./A.C. converter circuit is controlled through a pulse conversion circuit by the second output control signal.

In this circuit arrangement, the second output control signal is therefore formed independently of the opeating properties of the pulse conversion circuit, of the D.C./A.C. converter and of the load supplied through a transformer. Asymmetries present in these stages are not eliminated by the circuit and continuously lead to a D.C. component in the load or in the transformer preceding it.

In a further embodiment, the circuit arrangement according to the invention comprises a half-wave lengthening stage for enlarging the time interval of the occurrence of the switching signal in an optional time period immediately after the circuit arrangement has been put into operation. This stage is advantageous in a load, which takes up a very high initial current when put into operation. For example, upon the ignition of a high-pressure gas discharge lamp such a high current occurs and a correspondingly high measurement value is integrated by the integration stage. Thus, the reference value is attained more rapidly; the period duration of the current through the load decreases. In many cases, this is undesirable, for example during the operation of a high-pressure gas discharge lamp, which is coupled to an ignition circuit, which in turn was proportioned for a given period duration of the current flow. By the half-wave lengthening stage, the time intervals of the occurrence of the switching signal are now favourably enlarged with respect to the value they would have to assume only on account of the current through the load. Thus, an optimal period duration can be adjusted for the current through the load. The time interval, in which the half-wave lengthening stage is operative, can be chosen in accordance with the requirements.

According to a further embodiment of the invention, the reference values can be enlarged by the half-wave lengthening stage in the time period after the circuit arrangement has been put into operation. This can preferably be effected by change-over of an arrangement supplying the reference values. By enlargement of the reference values, the time period required by the integration stage for integrating the measurement value to the reference values is lengthened. However, the same effect is also attained by a corresponding change-over of the integration time constant in the integration stage.

The last-mentioned change-over possibility is preferably obtained in that the integration stage comprises an RC low-pass filter, whose capacitance can be connected in parallel with an additional capacitance in the time period after the circuit arrangement has been put into operation.

In another advantageous embodiment of the invention, a forced change-over stage for forcedly reversing the polarity of the current through the load is provided if the time interval of the occurrence of the switching signal exceeds a given value. The forced change-over stage becomes operative in the case in which the current through the load assumes excessively low values, for example in the case of a defect or a current interruption in the load. In this case, the period duration of the current through the load determined by the integration stage would become very long because the integrated measurement values attain the reference values only after a very long time duration. The switch bridge then remains in a given state for a correspondingly long time. In fact, after the switch bridge and the control circuit have been supplied, in such a case the associated supply voltage can decrease to such an extent that the operation of the circuit arrangement is adversely affected. The period duration, in which the direct voltage source can be connected to the load in alternating polarity, must then be limited towards large values. This is achieved in that after the termination of the corresponding time duration the forced change-over stage causes a forced reversal of the polarity of the current through the load, independently of the value instantaneously supplied by the integration stage.

An embodiment of the invention is shown in the drawing and is described more fully hereinafter.

Figure 2:
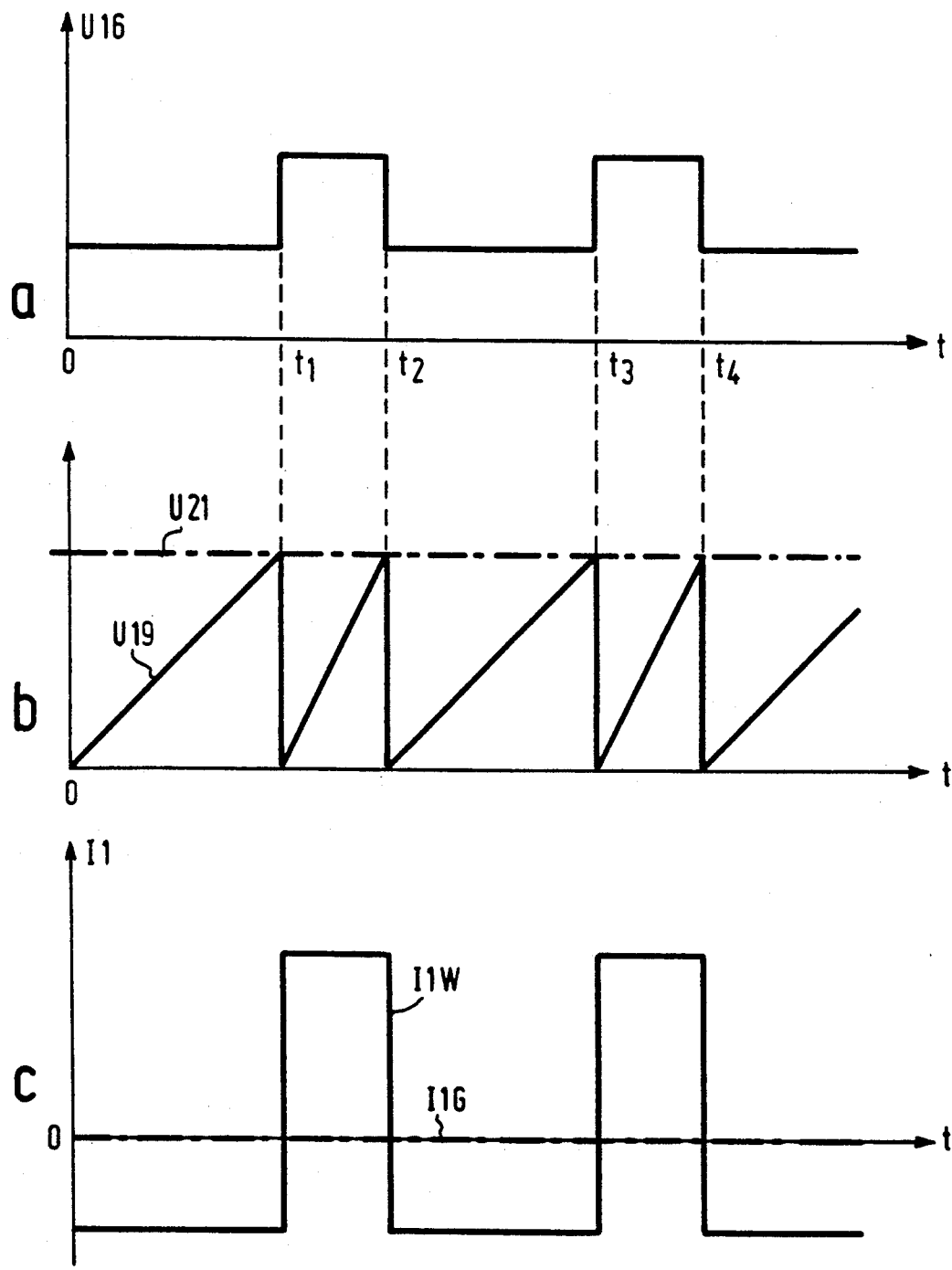
Figure 3:
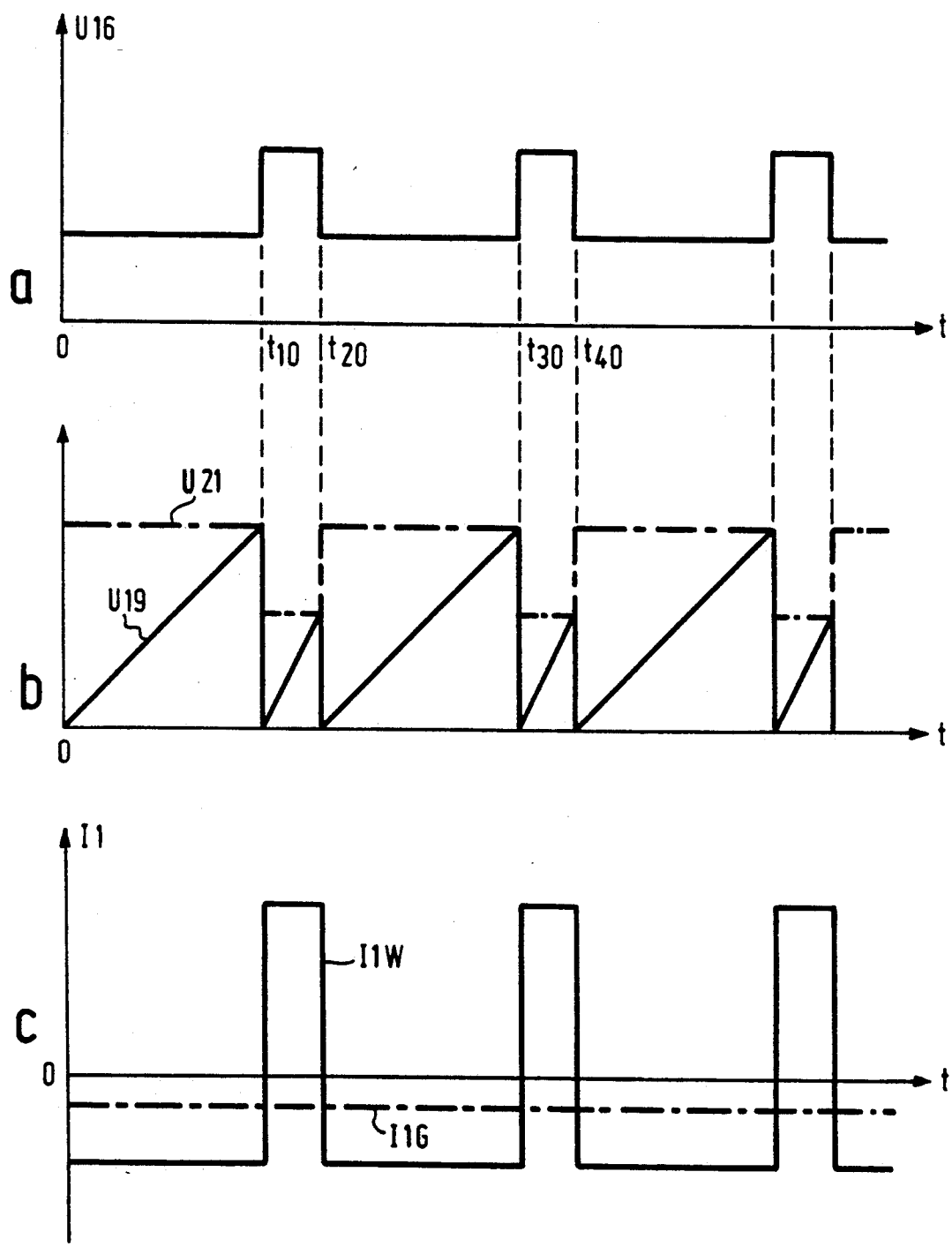
Figure 4:
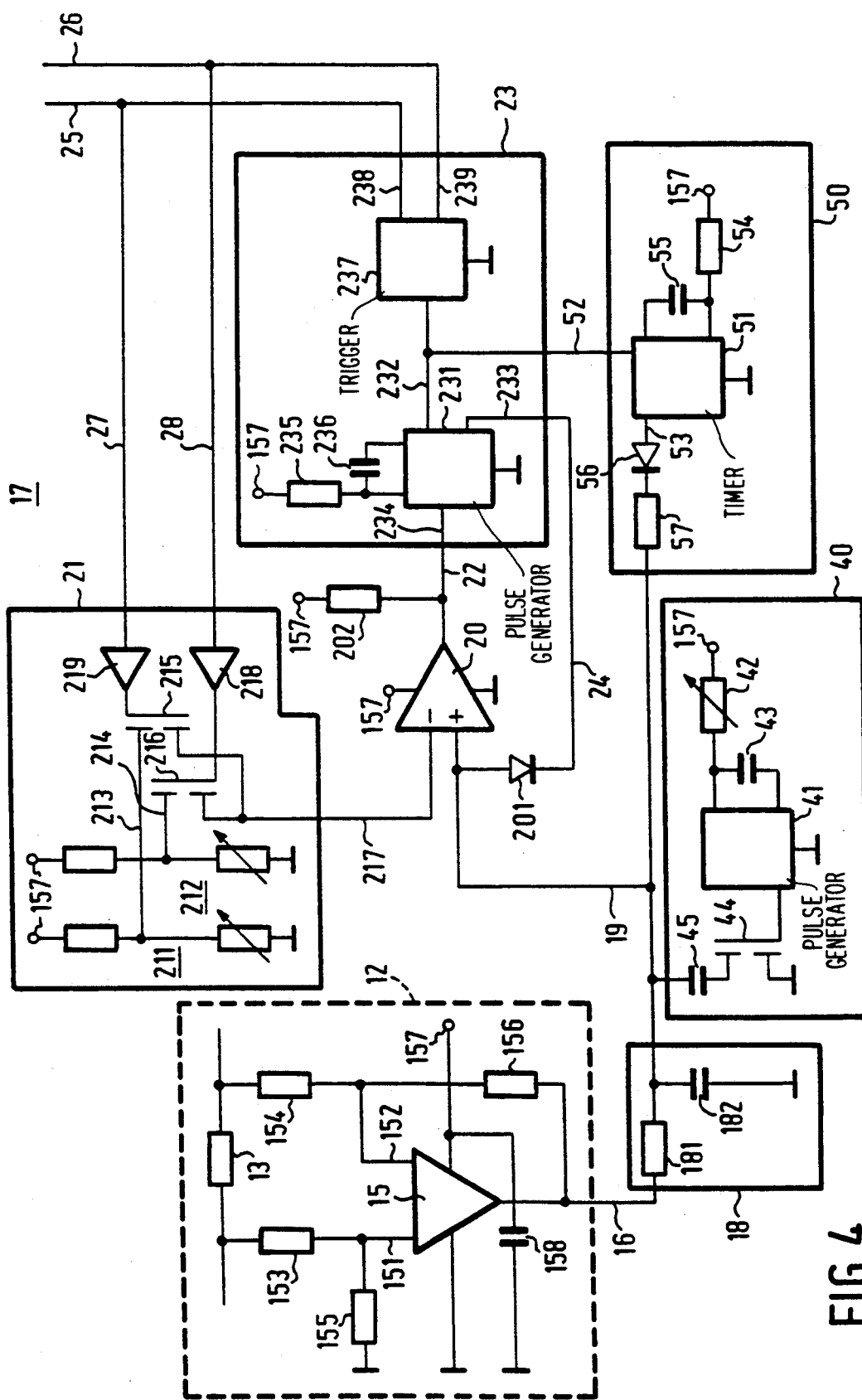

In the drawing:

FIG. 1 shows a circuit arrangement according to the invention for supplying a load, FIGS. 2 and 3 show time diagrams for the explanation of two modes of operation of the circuit arrangement shown in FIG. 1, and FIG. 4 shows in greater detail a control circuit for the use in a circuit arrangement shown in FIG. 1.

In the circuit arrangement shown in FIG. 1, the example of a load having a non-linear current-voltage characteristic curve is a gas discharge lamp 1, which is aranged in series with an ignition circuit 2. A terminal of the ignition circuit 2 is connected to a terminal of the gas discharge lamp 1, while a further terminal of the ignition circuit 2 is connected to the other terminal of the gas discharge lamp 1. Such ignition circuits are known in principle and therefore are not described in detail hereinafter.

The combination of the gas discharge lamp 1 and the ignition circuit 2 is inserted with the connection between the further terminal of the ignition circuit 2 and the terminal of the gas discharge lamp 1 on the one hand and with a third terminal of the ignition circuit 2 on the other hand as a transverse branch into a switch bridge, which consists of switch elements 3,4 in a first branch and 5, 6 in a second branch shown diagrammatically. The switch elements 3, 4, 5, 6 are represented as mechanical switches, it is true, but in practice they take the form of semiconductor switching elements, for example MOS transistors. Each of the switching elements 3, 4, 5, 6 is switched by an associated driver stage 7, 8, 9 and 10, respectively, to the conducting or the non-conducting state.

The two branches consisting of the series arrangements of the switch elements 3, 4 and 5, 6, respectively, to each of whose junction points the combination of the gas discharge lamp 1 and the ignition circuit 2 is connected, are combined in parallel with each other to form the switch bridge and are connected through an adjustable current-limiting resistor 11 and a measuring resistor 13 forming part of a device 12 for measuring a current through the gas discharge lamp 1 to a direct voltage source 14. The direct voltage source 14 is represented as a battery, but may also be constituted by a combinatorial circuit part or a combination of an energy storage and such a combinatorial circuit part.

The ignition circuit 2 is constructed so that during operation, when the gas discharge lamp 1 is ignited, no or only a negligibly small current is passed parallel to the gas discharge lamp 1. In a switching state, in which, for example, the switch elements 3 and 6 are conducting and the switch elements 4 and 5 are non-conducting, or conversely, the current flowing through the gas discharge lamp 1 then corresponds at least substantially exactly to the current through the measuring resistor 13. Due to the described switching states of the switching elements 3 to 6, moreover the current through the gas discharge lamp 1 can be optionally passed in both directions.

The device 12 for measuring the current through the gas discharge lamp 1 comprises besides the measuring resistor 13 further a measuring amplifier 15 having two inputs, each of which is connected to each time a terminal of the measuring resistor 13. The measuring amplifier 15 is preferably constructed as a differential amplifier, which delivers at its output 16 a measurement value in the form of an electrical voltage, which by means of the resistance value of the measuring resistor 13 is directly proportional to the current through the gas discharge lamp 1.

The measurement value of the output 16 of the measuring amplifier 15 is supplied to an integration stage 18 contained in a control circuit 17 and is integrated in this stage as a function of time. At an output 19, the integration stage 18 delivers an integrated measurement value, which, when current flows through the measuring resistor 13, continuously increases.

The integrated measurement value is supplied to the inverting input of a comparison stage 20, to whose non-inverting input is further supplied a reference value by a reference value generator 21. The integrated measurement value and the reference value are preferably transmitted and processed, like the measurement value at the output 16, in the form of electrical voltage (in the analog form). In a variation of the arrangement shown in FIG. 1, when the device 12 for measuring the current, the integration stage 18 and the comparison stage 20 are constructed in a corresponding manner, measurement and reference values may also be processed in the form of digital signals.

The comparison stage 20 delivers at its output 22 a switching signal if the integrated measurement value corresponds to the reference value, that is to say that it increases until it reaches this value. The switching signal of the output 22 is supplied to a signal-producing stage 23, which supplies through a reset lead 24 of the integration stage 18 a reset signal. As a result, the integration stage 18 is reset to an initial state, in which the integrated measurement value at the output 19 assumes a defined initial value, for example zero. With the succeeding current flow through the measuring resistor 13, starting from this initial stage, the measurement value at the output 16 of the device 12 are then again integrated until the integrated measurement value at the output 19 again reaches the reference value and a new switching signal is delivered by the comparison stage 20, which signal causes a new reset signal to be obtained at the reset lead 24.

By the signal-producing stage 23, further two oppositely polarized or complementary control signals are supplied to two control leads 25, 26, which are connected to the driver stages 7, 10 and 8, 9, respectively. By the control signals, the switch elements 3 and 6 and 5 and 4, respectively, are alternately switched to the conducting and to the non-conducting state, and conversely, through the driver stages 7 to 10. If, for example, a control signal having a high level is applied to the control lead 25, the switching elements 3, 6 become conducting through the driver stages 7, 10; correspondingly, through a control signal having a low level applied simultaneously to the stage lead 26, the switch elements 5 and 4 are passed by means of the driver stages 9,8 to the non-conducting state. From the direct voltage source 14, a current then flows through the current-limiting resistor 11, the switch element 3, the gas discharge lamp 1 with the ignition circuit 2, the switch element 6 and the measuring resistor 13. In the opposite case, the current flows through the gas discharge lamp 1 via the switch elements 5 and 4 and hence in a polarity opposite to that of the first case. At the measuring resistor 13, a current of the same polarity, i.e. the amount of the current through the gas discharge lamp 1, is constantly measured. For each polarity of the current through the gas discharge lamp 1, the measurement value is integrated in the manner described and, when the reference value is reached, i.e. when a given charge value which has flown through the gas discharge lamp 1 is reached, the polarity of the current through the gas discharge lamp is reversed. This process is repeated for the reversed polarity, and so on. As a result, for each polarity of the current through the gas discharge lamp, an accurately defined, i.e. precisely measured, electrical charge is constantly passed through the gas discharge lamp 1. With a constant reference value not varying with time, the charge quantities for both polarities of the current through the gas discharge lamp are identical. This identical character is guaranteed also with manufacturing tolerances in the circuit arrangement and with arbitrarily non-linear current-voltage characteristic curves of the gas discharge lamp 1. At any rate, a cataphoresis is thus effectively prevented without specific complicated control arrangements even for longer operating times.

The circuit arrangement shown in FIG. 1 offers within the control circuit 17 moreover the possibility of impressing a given average direct current on the gas discharge lamp 1 used as a load. For this purpose, the reference value generator 21 is constructed so that it can be changed over in such a manner that it can alternately supply to the non-inverting input of the comparison stage 20 two reference values that can be chosen differently. These reference values are effectively switched by the signal-producing stage 23 through leads 27, 28 branching from the control leads 25 and 26, respectively, by the control signals. One of the reference values is then fixedly assigned to each of the polarities of the current through the gas discharge lamp 1, independently of the duration of the current flow, which may be variable.

In FIG. 2, a diagram for the most important measurement values or signals and currents as a function of the time t is shown for explanation of the processing steps of the circuit arrangement of FIG. 1, part a of FIG. 2 shows the measurement value occurring at the output 16 of the measuring amplifier 15, which value is proportional to the amount of the current through the gas discharge lamp 1. This measurement value is indicated in the diagram by U16, part c of FIG. 2 shows the current I1 correspondingly thereto through the gas discharge lamp 1. In the time interval between the zero instant and the instant t1 chosen here, a negative current of comparatively small current strength flows through the measuring resistor 13. Correspondingly, the measurement value U16 has only a comparatively small amount. The voltage U19 shown in part b of FIG. 2, which represents the integrated measurement value at the output 19 of the integration stage 18, then exhibits a comparatively small rise as a function of the time t.

At the instant t1, the integrated measurement value U19 reaches the reference value designated in part b of FIG. 2 by U21. As a result, at the output 22 of the comparison stage 20 a switching signal appears, by which the current I1 in the gas discharge lamp 1 is repolarized. On account of the non-linear current-voltage characteristic curve of the gas discharge lamp 1, after the instant t1 a larger positive current flows through this lamp. Correspondingly, for the measurement value U16 a higher voltage is obtained, which leads to a stronger rise of the integrated measurement value U19 and starting at the instant t1 again at the value zero. The latter again reaches at the instant t2 the unchanged reference value U21. Since the rise of the integrated measurement value U19 is larger in the time interval between the instants t1 and t2 than before the instant t1, the time interval in which the current I1 assumes a comparatively high positive value, is correspondingly shorter.

At the instant t2, the current I1 through the gas discharge lamp 1 is changed over again to the polarity described first, so that the processes in the time interval between the instant zero and the instant t2 are repeated for the time after the instant t2.

In part c of FIG. 2, the described current I1 through the gas discharge lamp 1 changing its polarity is designated by I1W. The average value of this square wave alternating current is characterized by I1G and amounts exactly to zero.

FIG. 3 shows a mode of operation of the circuit arrangement shown in FIG. 1, in which the reference value U21 is changed over each time upon the occurrence of a switching signal at the output 22 of the comparison stage 20. In the time interval between the instant zero and the instant t10, a comparatively large reference value U21 is adjusted. Since the measurement value U16 is comparatively low, the result is a long time duration before the integrated measurement value U19 reaches the reference value U21. Correspondingly, the time interval between the instant zero and the instant t10 is comparatively long. In this time interval, a comparatively low current I1 of negative polarity flows.

At the instant t10, the polarity of the current I1 through the gas discharge lamp 1 is changed over again by the switching signal at the output 22 of the comparison stage 20. Now a positive current I1 flows in a comparatively large amount so that a correspondingly large measurement value U16 and hence a comparatively strong rise of the integrated measurement value U19 is obtained. Moreover, in the present example, at the instant t10 the reference value U21 is changed over to a lower value. As a whole, the integrated measurement value U19 therefore reaches the reference value U21 after a considerably shorter time duration than in the mode of operation shown in FIG. 2. At this instant t20, the polarity of the current I1 is changed over again; the variation in time of the time interval between the instant zero and the instant t20 is then repeated.

In part c of FIG. 2, the direct current, resulting in this mode of operation, which is negative in this case, is designated by I1G. Its value can be adjusted arbitrarily by the choice of the two values for the reference value U21.

FIG. 4 shows in greater detail a cut-out part of the circuit arrangement shown in FIG. 1, more particularly of the device 12 for measuring the current through the gas discharge lamp 1 and of the control circuit 17, which moreover comprises an addition as compared with FIG. 1. Elements already described are provided again with the same reference symbols.

The measuring amplifier 15 shown diagrammatically in FIG. 1 is constructed according to FIG. 4 as a differential amplifier, to whose inputs 151, 152 is supplied through input resistors 153, 154 the voltage derived at the measuring resistor 13. Of the input 151, moreover a resistor 155 is connected to earth, while of the input 152 a shunt resistor 156 is connected to the output 16 of the measuring amplifier 15. The measuring amplifier 15 is fed with energy through a current supply terminal 157, of which a supporting capacitor 158 is connected to earth.

In the arrangement shown in FIG. 4, the integration stage 18 comprises an RC low-pass filter consisting of a series resistor 181 and a parallel capacitance 182. This represents a particularly simple embodiment of the integration stage 18, which can be used advantageously especially for short charging times, i.e. short time periods of the current flow through the gas discharge lamp 1. Preferably, the RC low-pass filter 181, 182 is dimensioned so that the parallel capacitance 182-starting from the completely discharged state-is charged also with the longest time period of the current flow through the gas discharge lamp 1 only to a small voltage value as compared with the supply voltage at the current supply terminal 157. In fact, the charge of the parallel capacitor 182 then still takes place substantially linearly with time.

In a more complicated embodiment of the circuit arrangement shown in FIG. 4, the integration stage 18 may also be provided in known manner with an operational amplifier.

The signal-producing stage 23 comprises in the arrangement shown in FIG. 4 a pulse-producing stage 231, which is constituted, for example, by a monostable multivibrator and delivers a voltage pulse at its outputs 232, 233 if a rising signal edge—the switching signal—occurs at its input 234 coupled to the output 22 of the comparison stage 20. The duration of this voltage pulse is determined by a resistor 235 determining the pulse duration and a capacitance 236 determining the pulse duration, by means of which the pulse-producing stage 231 is switched in known manner. The voltage pulse occurring at the output 233 is polarized negatively and causes upon the occurrence of the switching signal through the reset lead 24 and a decoupling diode 201 a discharge of the parallel capacitor 182 of the integration stage 18 through its output 19.

From the output 232, the voltage pulse—polarized in this case, for example, positively—arrives at the switching input of a change-over stage 237, which is preferably constructed as a bistable trigger stage and delivers at its outputs 238, 239 opposite control signals each time interchanged in their levels upon the occurrence of a voltage pulse at the output 232. These signals are conducted away as control signals complementary to each other through the control leads 25 and 26, respectively.

The control signals complementary to each other moreover arrive through the leads 27, 28 at the reference value generator 21. The latter comprises for each reference value to be adjusted an adjustable voltage divider 211, 212. Of each of the adjustable voltage dividers 211 and 212, respectively, a centre tapping 213 and 214, respectively, is connected through a switching transistor 215 and 216, respectively, to a common reference value output 217. The switching transistors 215, 216 are switched on alternately through driver stages 218 and 219, respectively, which, as the case may be, comprise a potential shift for the control signals at the leads 27, 28 and may also be omitted with suitable potentials for driving the switching transistors 215, 216, by the control signals from the signal-producing stage 23. As a result, in the rhythm of the repolarizations of the current through the gas discharge lamp 1, at the reference value output 217 a reference value alternating with the adjustments of the voltage dividers 211, 212 appears at the comparison stage 20, i.e. in the example of FIG. 4 at its inverting input, in contrast with the example of FIG. 1, in which the reference value is supplied to the non-inverting input of the comparison stage 20. However, this essentially does not mean a change of the mode of operation of the circuit arrangement.

In FIG. 4, moreover the output 22 of the comparison stage 20 is connected through a supply resistor 202 to the current supply terminal 157. For the sake of simplicity, all the further signal processing stages of the control circuit 17 are also connected to the current supply terminal 157. Of course, the individual signal processing stages may also be supplied by different supply voltage sources.

The circuit arrangement shown in FIG. 4 comprises in comparison with the circuit arrangement of FIG. 1 additionally a half-wave lengthening stage 40. The latter comprises a pulse-producing stage 41 for forming a switching-on pulse immediately after the circuit arrangement i.e. the control circuit 17, has been put into operation. The duration of this switching-on pulse is again defined in a usual manner by a resistor 42 connected to the pulse-producing stage 41 and determining the pulse duration and a capacitance 43 determining the pulse duration in such a manner that it covers the time interval from the instant at which the circuit arrangement is put into operation to the instant at which the gas discharge lamp is reliably ignited. During this time interval, an additional capacitance 45 is connected by the pulse-producing stage 41 through a switching transistor 44 parallel to the parallel capacitance 182 of the RC low-pass filter 181, 182.

By the half-wave lengthening stage 40, in this manner the period duration for the repolarization of the current through the gas discharge lamp 1 is lengthened in a time interval immediately after the gas discharge lamp has been put into operation, i.e. during the ignition process. Thus, the effect is counteracted that during the ignition of the gas discharge lamp 1 a considerably higher current flows through this lamp than during the operation after the ignition of the gas discharge. This high current at the measuring resistor 13 would lead to a strongly accelerated charge of the parallel capacitance 182 so that considerably shorter change-over periods are obtained by the integration stage 18. In order to avoid this, according to FIG. 4 the parallel capacitance 182 is enlarged by the additional capacitance 45 in such a manner that the integration of the measurement value at the output 19 of the integration stage 18 takes place at least substantially with the same time constant during the ignition process as during the operation of the gas discharge lamp 1 after the ignition of the gas discharge lamp.

In a variation of the circuit arrangement according to FIG. 4, the same result can be attained in that by the half-wave lengthening stage 40, more particularly by the pulse-producing stage 41 contained therein, through the switching transistor 44 instead of the additional capacitance 45 an additional reference voltage generator, for example an additional voltage divider in the form of the voltage dividers 211, 212, is connected in the time interval immediately after the circuit arrangement has been put into operation to the reference value output 217. By this additional voltage divider or reference value generator, a correspondingly enlarged reference value is then supplied to the comparison stage so that the period duration of the current through the gas discharge lamp 1 during the ignition process again approximately corresponds to that during the succeeding operation of the lamp.

The resistor 42 determining the pulse duration contained in the half-wave lengthening stage 40 is constructed so as to be adjustable in order to permit a simple adaptation of the duration of the switching-on pulse to the operation of the lamp used.

FIG. 4 further shows a forced change-over stage 50, which comprises a timer 51, which in the present embodiment is composed in accordance with the pulse-producing stages 41 or 231. The timer 251 is controlled at its input 52 by the voltage pulse at the output 232 of the pulse-producing stage 231. Upon the occurrence of this voltage pulse, a low voltage level is produced at the output 53 of the timer 51, which voltage level is maintained as long as the time interval between two voltage pulses arriving at the input 52 does not exceed a given value. For adjusting this value, the timer 251 is connected in known manner to a resistor 54 determining the time and a capacitance 55 determining the time. If on the contrary the time interval between two voltage pulses becomes too large, the output 53 is switched to a high voltage level. Through a decoupling diode 56 and a series resistor 57, this voltage level is switched to the output 19 of the integration stage 18 and there leads to a comparatively rapid charge of the parallel capacitance 182. Thus, the voltage applied to the parallel capacitance 18 now reaches very rapidly the reference value so that the comparison stage 20 emits a switching signal.

When the time interval between two switching signals at the output 22 is exceeded, the time period of the flow of current through the gas discharge lamp 1 is therefore limited by the forced change-over stage 50. This drop occurs particularly with an excessively low current through the gas discharge lamp 1, for example when the lamp has reached the end of its life, has become defective or has been removed. In the extreme case, the ignition circuit 2 would then be traversed only by a current, which without the use of the forced change-over stage 50 would lead to very long time periods for the change-over of the switch bridge 3 to 6. Such long time periods can lead in given cases to difficulties with the current supply especially of the switch elements 3 and 5 in the form of transistors, however. Moreover, the necessity of long time periods would adversely affect the dimensioning of the switch bridge 3 to 6.

We claim:

1. A circuit arrangement for supplying a load (1) from a direct voltage source (14) through a switch bridge (3 to 6), by which the direct voltage source (14) can be connected in alternating polarity to the load (1), comprising a control circuit (17) for controlling the switch bridge (3 to 6), characterized by a device (12) for measuring a current (I1) through the load (1) and supplying a corresponding measurement value and in that the control circuit (17) comprises an integration stage (18) for integrating the measurement value, a comparison stage (20) for comparing the integrated measurement value with a reference value and for supplying a switching signal when these values correspond to each other and a signal-producing stage (23) for resetting the integration stage (18) to an initial state and for reversing the polarity of the current (I1) through the load (1) upon the occurrence of the switching signal and wherein a half wave lengthening stage (40) is provided for enlarging the time interval of the occurrence of the switching signal in a time period that can be chosen immediately after the circuit arrangement has been put into operation.

2. A circuit arrangement as claimed in claim 1, characterized in that means are provided for changing the reference value each occurrence of the switching signal between two given values.

3. A circuit arrangement as claimed in claim 2, characterized in that the reference value can be enlarged by the half-wave lengthening stage (40) in the time period after the circuit arrangement has been put into operation.

4. A circuit arrangement as claimed in claim 2, characterized in that, the integration stage (18) comprises an RC low-pass filter, whose capacitance (182) can have connected parallel to it in the time period after the circuit arrangement has been put into opertion an additional capacitance (45).

5. A circuit arrangement as claimed in claim 4, characterized by a forced change-over stage (50) for forcedly reversing the polarity of the current (I1) through the load (1) when the time interval of the occurrence of the switching signal exceeds a given value.

* * * * *